(12) United States Patent
Stringer et al.

(10) Patent No.: US 9,176,638 B2
(45) Date of Patent: Nov. 3, 2015

(54) USER INTERFACE FOR LARGE SCALE SYSTEM MONITORING

(75) Inventors: Michael Spencer Stringer, Pompano Beach, FL (US); Jungang Wei, Saratoga, CA (US); Zhongming Shen, Sunnyvale, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 145 days.

(21) Appl. No.: 13/398,302

(22) Filed: Feb. 16, 2012

(65) Prior Publication Data

US 2013/0055166 A1 Feb. 28, 2013

Related U.S. Application Data

(60) Provisional application No. 61/528,090, filed on Aug. 26, 2011.

(51) Int. Cl.
*G06F 3/048* (2013.01)
*G06F 3/0481* (2013.01)

(52) U.S. Cl.
CPC .... *G06F 3/0481* (2013.01); *G06F 2203/04803* (2013.01)

(58) Field of Classification Search
CPC .... G06F 9/45533; G06F 9/4443; H04L 41/22
USPC .......... 715/853, 215; 345/440, 441; 707/603, 707/758
See application file for complete search history.

(56) References Cited

U.S. PATENT DOCUMENTS

| | | | |
|---|---|---|---|
| 6,222,547 B1* | 4/2001 | Schwuttke et al. | 345/419 |
| 7,000,193 B1* | 2/2006 | Impink et al. | 715/771 |
| 2004/0243945 A1* | 12/2004 | Benhase et al. | 715/853 |
| 2005/0216860 A1* | 9/2005 | Petrov et al. | 715/810 |
| 2007/0005266 A1* | 1/2007 | Blevins et al. | 702/22 |
| 2009/0070771 A1* | 3/2009 | Yuyitung et al. | 718/105 |
| 2009/0222547 A1* | 9/2009 | Boylan et al. | 709/223 |
| 2012/0331462 A1* | 12/2012 | Falko | 718/1 |

* cited by examiner

*Primary Examiner* — Kieu Vu
*Assistant Examiner* — Joy M Weber
(74) *Attorney, Agent, or Firm* — Banner & Witcoff, Ltd.

(57) ABSTRACT

User interfaces that enable monitoring of the configuration and status of computing systems are disclosed. The user interfaces may summarize data collected from a plurality of computing systems. The data may be summarized by flagging collected information that does not match a set of reference information or the collected information from other systems. The flags may be presented at a variety of levels of granularity, and the presence of a flag at one level of granularity may indicate the presence of a flagged item at any lower level of granularity. A dynamic hierarchical user interface provides a user with a high level overview of system status, as well as the ability to drill down to identify specific system information that does not adhere to a specified configuration.

27 Claims, 13 Drawing Sheets

USER INTERFACE FOR LARGE SCALE SYSTEM MONITORING

RELATED APPLICATION

This application claims the benefit of priority from U.S. Provisional Application No. 61/528,090, entitled "Large Scale System Health Monitoring and Troubleshooting," filed Aug. 26, 2011. The content of the above-noted application is hereby incorporated by reference in its entirety.

BACKGROUND

Organizations often manage multiple computing systems simultaneously. In many cases, several of the computing systems work together to accomplish a similar task. Examples include similarly or identically configured servers amongst which work is split using load balancing techniques. In other cases, each computing system performs a unique task. As the number of computing systems being managed grows, ensuring that configuration changes are made to all relevant systems becomes increasingly difficult. For example, ensuring that a hotfix is applied to all relevant computing systems may involve reviewing a large amount of information. Similarly, monitoring the status of the various systems, such as each system's health, becomes more difficult as the number of systems grows.

SUMMARY

According to one aspect, information collected from a plurality of computing systems, such as configuration information or status information, is analyzed and any noteworthy items of information are flagged. Items of information may be flagged, for example, because the information does not match the corresponding information retrieved from another computing system. Items may also be flagged, for example, because the information does not match a set of reference information. The items of reference information may be a textual string or numerical value. Other items of reference information may be a set of defined criteria, such the amounts of memory usage that are considered acceptable.

According to another aspect, information collected from computing systems may be organized into a hierarchy that may be displayed as a tree. Each level of the hierarchy may contain one or more individual items of information. Each level of the hierarchy may also contain lower levels of the hierarchy, which themselves contain still lower levels and/or individual items of information. The hierarchy may be configurable. The tree display of the hierarchy may be collapsible such that some or all of the lower levels are not shown.

According to a further aspect, information collected from computing systems may be displayed using a data grid. Multiple data grids may be used to display the information at several levels of granularity. The levels of granularity may correspond to levels of the data hierarchy mentioned above. Selecting cells of a data grid may display more details about the information that the selected cell summarizes. In some cases, the additional details may be displayed in the form of a data grid having a lower level of granularity than the first data grid.

According to yet another aspect, flagged information may be summarized using a tree or data grid display. These displays may include visual indications of flags, such as icons or color coding. An indication of a flag on a group, such as a node of a tree or a cell of a data grid, may indicate the presence of at least one flagged item. Conversely, an unflagged item representing a group may indicate the absence of flagged items within the group.

According to a still further aspect, a tree and a data grid display may be used in conjunction so that the tree allows for the level of granularity of the data grid to be selected.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIGS. 9-12 illustrate additional examples of user interfaces containing data grids.

FIGS. 13 and 14 illustrate examples of a user interface that may be used to specify the individual items that are to be collected from computing systems for comparison.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
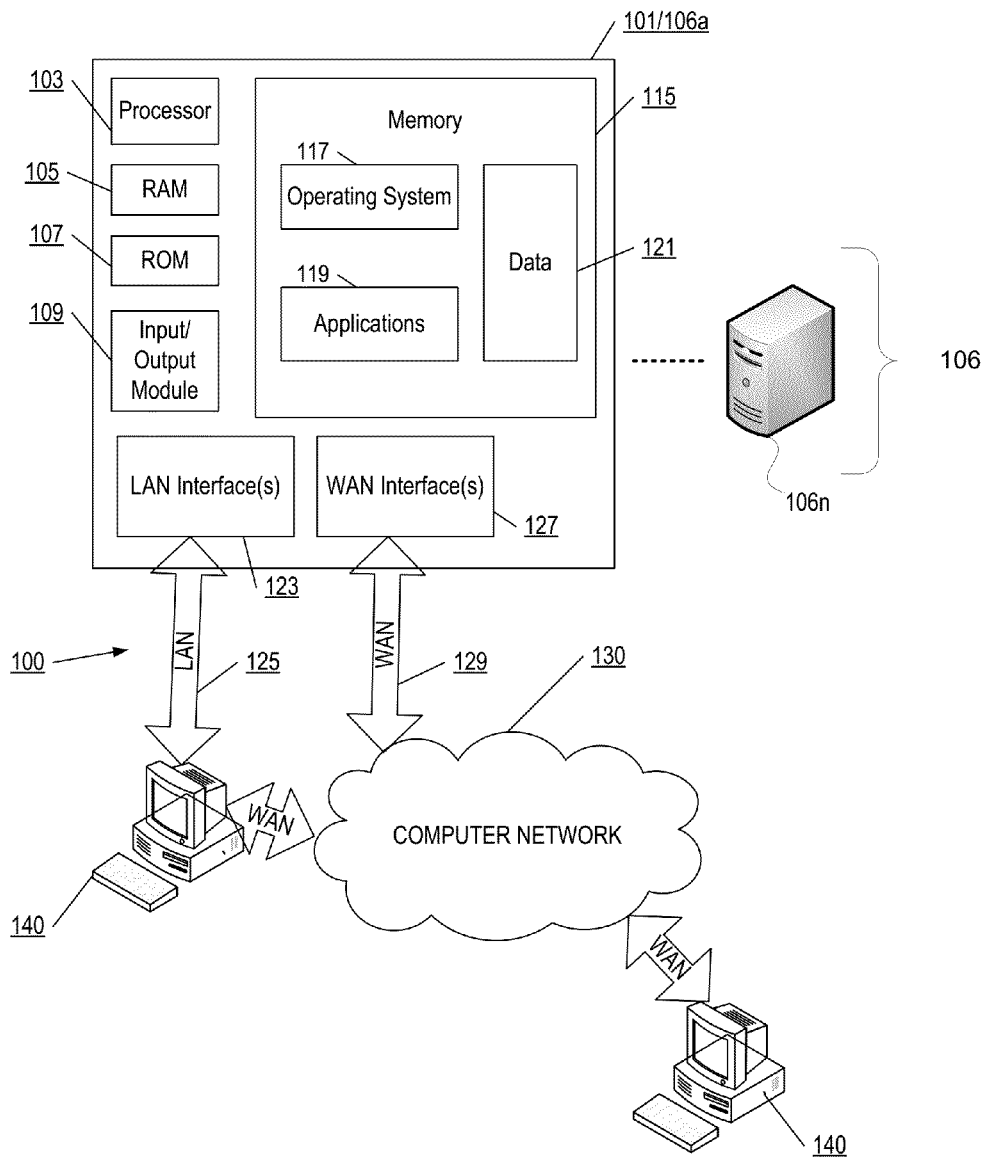
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In some embodiments, the computing environment 100 may include an appliance installed between the server(s) 106 and client machine(s) 140. The appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In some embodiments a single client machine 140 communicates with more than one server 106, while in other embodiments a single server 106 communicates with more than one client machine 140. In yet other embodiments, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 140 may be a virtual machine. The virtual machine may be any virtual machine, while in some embodiments the virtual machine may be any virtual machine managed by a hypervisor developed by CITRIX SYSTEMS, IBM, VMWARE, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
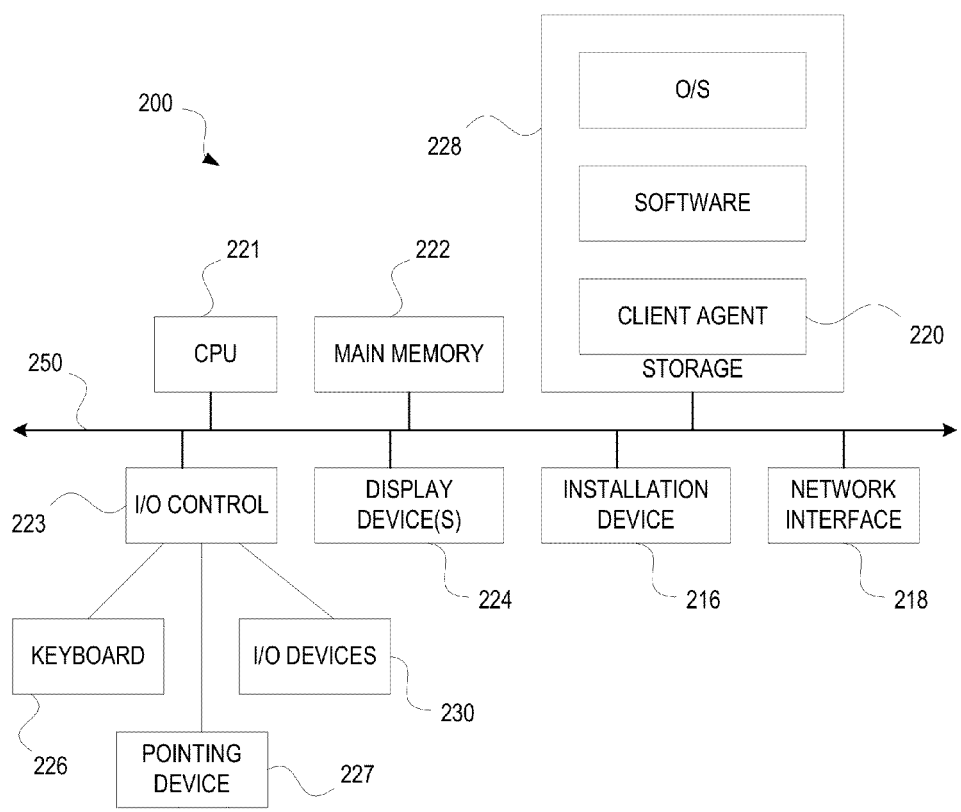
FIG. 2 illustrates a client device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
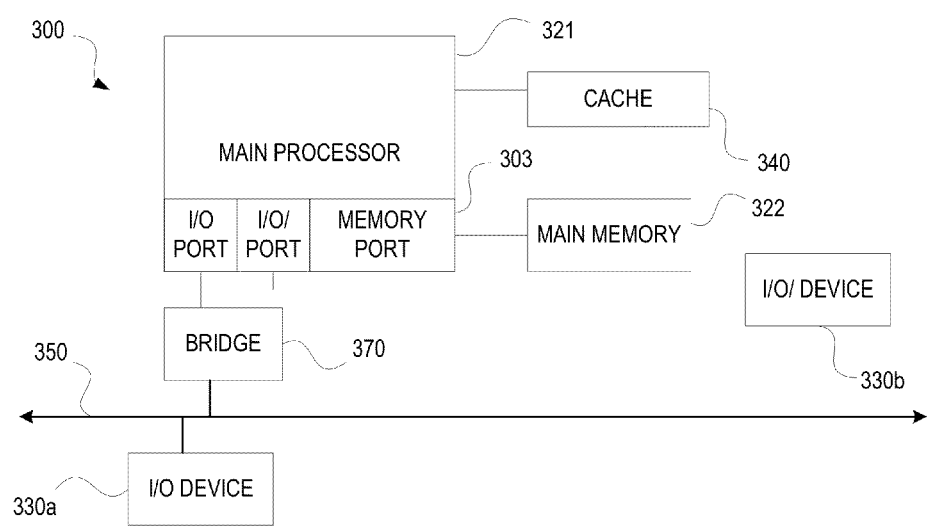
FIG. 3 illustrates a client device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; those manufactured by International Business Machines; a processor such as those manufactured by Advanced Micro Devices; or any other combination of logic circuits. Still other embodiments of the central processing unit 321 may include any combination of the following: a microprocessor, a microcontroller, a central processing unit with a single processing core, a central processing unit with two processing cores, or a central processing unit with more than two processing cores.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In some embodiments, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In some embodiments, the one or more processing cores or processors in the computing device 300 can each access local memory. In still other embodiments, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SO/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The systems and architectures described above with reference to FIGS. 1-3, as well as other systems and architectures, may be used to implement the functionality described below.

Figure 4:
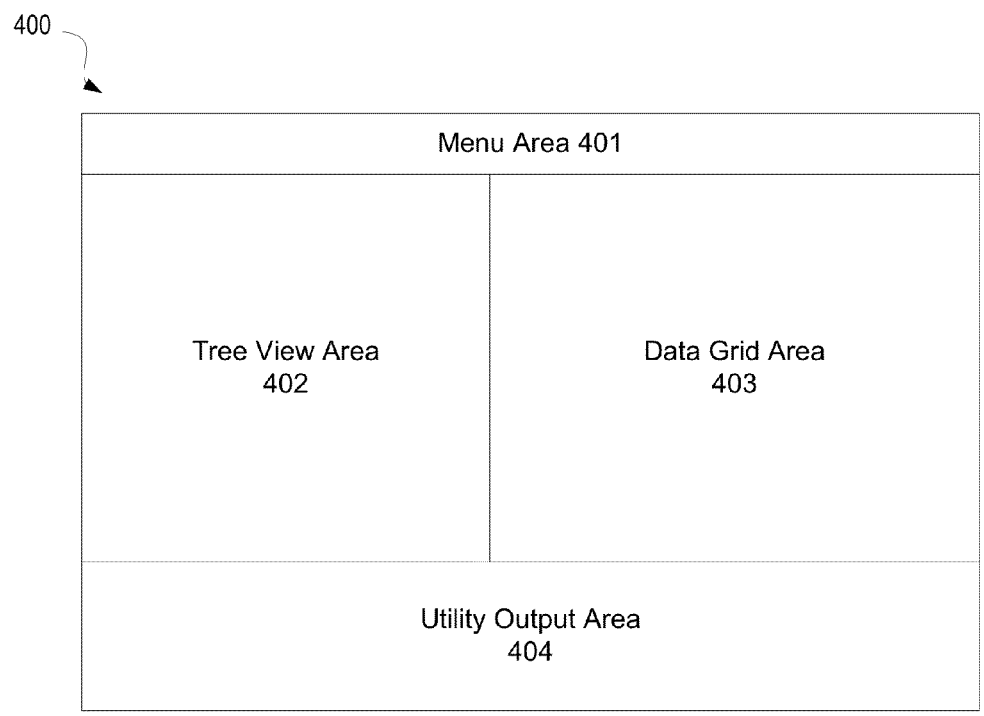
FIG. 4 illustrates an example of a layout of a user interface that may be used to display system monitoring information.

FIG. 4 illustrates an example of a layout of a user interface that may be used to display system monitoring information. In this example, display 400 includes four areas that may be used for accessing or displaying information about one or more computing systems. The presence, arrangement, and proportions of areas 401, 402, 403, and 404 shown in FIG. 4 are merely an example, and many other layouts are possible.

Menu area 401 may display drop-down menus used to access various tools or options. Menu area 401 may also display summary information and include other interfaces to various tools or options, such as buttons or check boxes. The tools and/or options accessible through menu area 401 may affect or control the data displayed in the other areas of display 400, such as Tree View Area 402, Data Grid Area 403, and Utility Output Area 404. A user may, for example, reconfigure display 400 using options accessible from the menu area. An example of reconfiguring display 400 is hiding utility output area 404, or another of the areas, from view. Other examples of the types of tools and/or options accessible through menu area 401 include controls that alter the contents of the tree shown in tree view area 402, tools that define the data to be displayed in data grid area 403, and tools that display output in utility output area 404. The foregoing are merely examples, and any type of tools, controls, information displays, etc. may be included in menu area 401.

Display 400 may be used to monitor the status and/or configuration of one or more computing systems. Each computing system may be located on a dedicated physical machine, but this is not required. Several computing systems may be located on a single physical machine. For example, a single physical computer may run multiple virtualized computing systems, where each computing system runs its own operating system. The configuration or status of each of these computing systems, as well as other computing systems, may be displayed using display 400.

The information that may be aggregated and displayed using a display such as display 400 is unlimited. In some embodiments, the information that is displayed or summarized on display 400 is configurable. Thus, a user or system administrator may select the information to be displayed. Examples of types of information that may be displayed in display 400 include configuration information and status information. Examples of configuration information for a computing system include the identity and configuration of its operating system. This may include which hotfixes or patches have been applied to the operating system; which components of the operating system, including system services, are enabled or disabled and any options associated with such components; the date, size, checksum or hash associated with system files; version information for drivers; system registry keys; etc. Configuration information may also include the configuration of client software in addition to the operating system. Examples of client software configuration information include what client software is installed, including which hotfixes or patches have been applied; how the client software is configured, including if any components are enabled or disabled; the status of any files of interest, such as their date, size, checksum, or hash; etc. Additional examples of configuration information include hardware configuration. Examples include the presence and version of components, such as processors, memory, hard disks, or other connected devices. Still further examples include network configuration information, such as IP addresses, connected storage volumes, etc.

Examples of status information for a computing system include processor load, temperature, error logs or error messages, available memory, a sampling of a server's response time to various requests, the number of simultaneous users of a system, local or remote storage usage, logs of application changes, the number of busy threads, numbers of computing requests that are ready to be executed, queued to be executed, or currently being executed, etc. Status information may include, for example, system health information.

Configuration, status, or any other information may be collected from any number of computing systems. An example of information that may be displayed in utility output area 404 is the progress of collecting information from various computing systems. Once collected, the information may be saved and used for future comparisons. In some embodiments, the collected information is simply read from a file, a database, or from another memory. Thus, the process of collecting the information from computing systems may be separated from the process of displaying the information. In some embodiments, information may be collected by querying remote computing systems using, for example, a script such as a PowerShell script. The systems to be queried may be predefined, or they may be discovered automatically by locating, for example, all of the computing systems within a network group. Examples include all of the computing systems in the same domain as the system sending the queries, all of the servers associated with, for example, a desktop delivery controller. In still further embodiments, information may be collected by it being automatically reported to a database or other system even absent a query. Some embodiments may combine some or all of these methods of data collection.

In many cases, the amount of information collected is too large for a linear display to be useful. For example, if a system administrator of two 300-computing system server farms were to check the available memory for these two server farms, the collected information would include six-hundred individual memory amounts for the system administrator to review. In this example, the system administrator may only be interested in whether the amount of available memory on the computing systems is atypical or problematic. This may be determined by comparing each piece of collected information with other pieces of collected information. In this example, atypically large or small amounts of available memory may then be flagged for the user. A user may also configure the user interface to flag when the collected information meets certain thresholds or otherwise matches certain criteria. For example, a user may configure the user interface to flag systems where the available memory is less that 1 GB, and to not flag other systems. A variety of other types of criteria may be used.

If no flags are shown, a system administrator or other user may conclude that no further investigation is needed. If flags are shown, a system administrator may seek to view additional details about the systems from which the flagged information was collected. These details may be viewed individually, or in comparison to other computing systems, including individual computing systems or an average of some or all of the computing systems for which information was collected.

A useful tool for investigating the configuration and/or status of large numbers of computing systems is to compare information collected from the monitored computing systems with a set of reference data. Systems whose collected information does not match the reference data or whose collected information falls outside the bounds defined by the reference data may be flagged.

An example of reference data is the information collected from a "golden machine" that is known to have the configuration or status characteristics that are sought. In some cases, the reference data may be retrieved from one or more "golden machines" on a continual or periodic basis. In other cases, the reference data may be saved, and even the original "golden machine" may be flagged if its configuration no longer matches the saved reference data. Reference data may also be manually specified, and need not have come from a "golden machine" or other computing system.

More than one configuration of a computing system may be monitored. For example, some computing systems may be configured for providing remote desktops while other computing systems may be configured for serving web pages. The remote desktop systems may be assigned to one group, and the web server systems may be assigned to another group. Each group (or subgroup) may have its own set of reference data. Alternatively, the collected information for any one computing system may be compared only against other systems in the same group or subgroup for the purpose of flagging differences. This may be useful because certain differences between these group of machines are intentional and a user may not want detection of those differences to raise a flag. Groups may be defined by a user or system administrator and stored in memory, such as in an XML file. Default groups may also be discovered automatically based on, for example, type information, detected geographical location, IP addresses, domain membership, etc.

Tree view area 402 and data grid area 403 may be used separately or in combination. Each provide useful ways of displaying information collected from a group of computing systems, including displaying the presence or absence of any flags. When used together, tree view area 402 may be used to display a hierarchical organization of the information collected from computing systems. Data grid area 403 may be used to show details of each node of the tree shown in tree view area 402.

Figure 5:
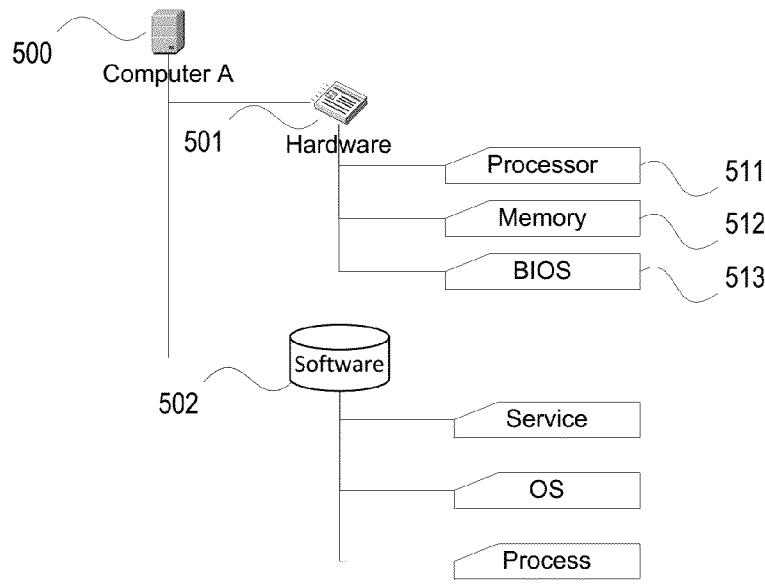
FIG. 5 illustrates an example of a hierarchy that may be used to organize information collected from a computing system.

FIG. 5 illustrates an example of a hierarchy that may be used to organize information collected from a computing system. While this hierarchy may be purely logical, it may also be displayed as a tree in tree view area 402. The example of FIG. 5 shows information about computing system 500 (labeled "Computer A"). The information about computing system 500 may be sub-divided into two groups: hardware information 501 and software information 502. The hardware information group 501 includes processor information group 511, memory information group 512, and BIOS information group 513. Examples of processor information include the type of processor(s) used by the computing system and current or historical processor utilization. Examples of memory information include the type(s) and amount(s) of memory available to a computing system, current or historical memory utilization, and any error information, such as a hard disk's automated error reporting. Examples of BIOS information include the type of BIOS used and each of the BIOS settings. Of course, many other examples of hardware information exist and may optionally be included in the information that is collected and monitored. Although a default information hierarchy may be used, a user may also specify the information to be collected and the organization of that information into a hierarchy. Examples of criteria that may be used to group nodes and subnodes in the information hierarchy include type information, such as setting types or machine types, geographical location of the corresponding computing system, computing system status, whether a computing system or component is healthy, IP addresses, domain membership or other group membership, etc.

Where multiple computing systems operate on the same physical machine, hardware information may be reported for each computing system even where it may be duplicative. Alternatively, each computing system running on the same physical machine may be grouped together in the tree hierarchies such as the one seen in FIG. 5. For example, if "Computer A" were running two independent computing systems, software 502 may represent the first computing system, and a second software group (not shown) may be used to represent the second computing system. Both software groups may be displayed as child nodes of "Computer A."

Figure 6:
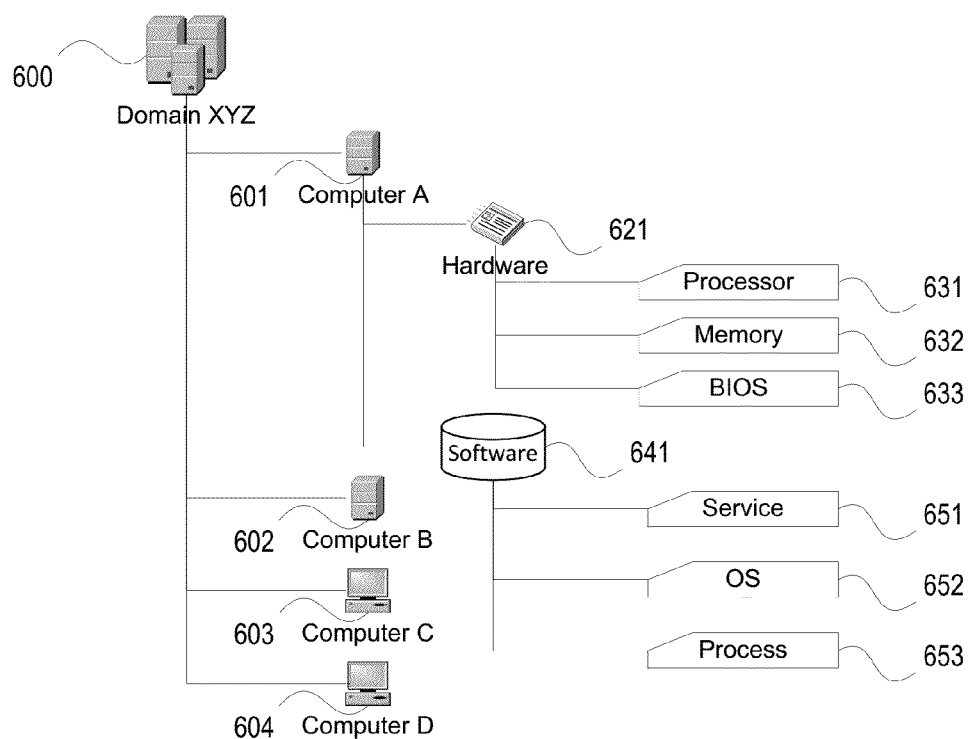
FIGS. 6 and 7 illustrate examples of hierarchies that may be used to organize information collected from multiple computing systems.

FIG. 6 illustrates an example of a hierarchy that may be used to organize information collected from multiple computing systems. Each computing system may run on the same physical machine, or some or all of the computing systems may run on separate physical machines. Where several computing systems run on the same physical machine, the hierarchy may reflect the common hardware, as discussed above. In the example of FIG. 6, "Domain XYZ" is a group (600) that includes computing systems 601-604 (labeled "Computer A," "Computer B," etc.). Thus, the information about computing systems 601-604 have been grouped together. Additional groups containing additional computing systems may be included. While the example of a domain is used in the example of FIG. 6, other methods of grouping computing systems may be used, including a manual assignment of computers to user-defined groups.

FIG. 6 illustrates that the entire hierarchy need not be displayed. Computing system 601 has been expanded to show hardware node 621 and software node 641, as well as respective sub-nodes 631-633 and 651-653. Some or all of subnodes 631-633 and 651-653 may be expandable further. For example, if computing system 601 includes two processors, then these processors may be grouped under processor node 631, which may be expanded to include a separate node for each of the processors. Conversely, the sub-nodes for computing systems 602-604 are not shown. The sub-nodes of each of these systems may be displayed by, for example, double clicking on the appropriate node of the tree. Node 600 may also be collapsed such that none of computing systems 601-604 are displayed individually.

The hierarchical organization of the information shown in FIGS. 5 and 6 may be used to summarize the collected information. For example, notice that nodes 603 and 604 are displayed differently from how nodes 601 and 602 are displayed. The different display of nodes 603 and 604 may be a visual indicating that information falling under nodes 603 and 604 has been flagged. Instead of, or in addition to, the example of a different icon seen in FIG. 6, other visual indications that data has been flagged may be used. For example the icon for a flagged node may be displayed in a different color or may be highlighted in a different color than the icon for a non-flagged node. Icons are not necessary, and different color text, highlighting, or other visual alterations may be used to show that a node has been flagged.

As discussed above, information may be flagged because it doesn't match other systems in a group or it doesn't match reference data. In the example of FIG. 6, the differing icons for nodes 603 and/or 604 may be investigated by expanding these nodes. When the flagged node is expanded, one or more sub-nodes will be flagged, indicating the location(s) in the hierarchy of the flagged information. In other words, a flagged node indicates that at least one item contained in the group of information represented by the node has been flagged. The individual items of flagged information may ultimately be displayed at the lowest levels of the hierarchy. Alternatively, selecting a flagged node at the lowest level of the hierarchy may cause a second display to open presenting the flagged information. Additional, unflagged information that also corresponds to the node may be displayed as well. Selecting unflagged nodes may also cause a second display to open presenting the unflagged information that corresponds to the node. The information corresponding to a node may be displayed, for example, in data grid area 403 of FIG. 4. Selecting a node that is not at the lowest level of the hierarchy may also cause information corresponding to that node to be displayed. The information corresponding to a node may be displayed in a list or table format. Also, the information corresponding to a node may be displayed as a comparison to other information. Examples of how comparisons between items of information may be displayed are discussed in more detail below with reference to FIGS. 8-12.

Flagging information in the tree view of the information hierarchy allows for easy verification that all systems are configured correctly and/or performing optimally. If the top level of the hierarchy shows no flags, then all of the collected information matches the relevant reference data. Where the computing systems are compared against one another, the absence of flags at the top level of the hierarchy indicates that the collected data for each of the computing systems matches. A user may perceive a need to explore lower levels of the hierarchy only if a flag is present. The hierarchical organization allows for the flagged data to be identified quickly. For example, the computing systems for which a misconfiguration (or other flagged condition) was detected may be displayed at the next lower level of the hierarchy, and whether the misconfiguration relates to hardware or software may be displayed at the level below that. Proceeding to still lower levels may reveal precisely what the misconfiguration is. Thus, flagged data may be identified easily, even when the set of computing systems being checked becomes large. Similarly, the top levels of the hierarchy may summarize the collected data succinctly, even when the set of computing systems being checked becomes large.

The reference data against which the information collected from a computing system is compared is not necessarily the same for each computing system that is grouped together in the tree view hierarchy, such as the one of FIG. 6. For example, in FIG. 6, "Computer C" (represented by node 603) may be compared to a different set of reference data than "Computer D" (represented by node 604). This may be preferable, for example, because these computing systems are configured for different purposes. It is also possible that the groupings seen in the hierarchy do correspond to the reference data to which the collected information for a computing system is compared.

Figure 7:
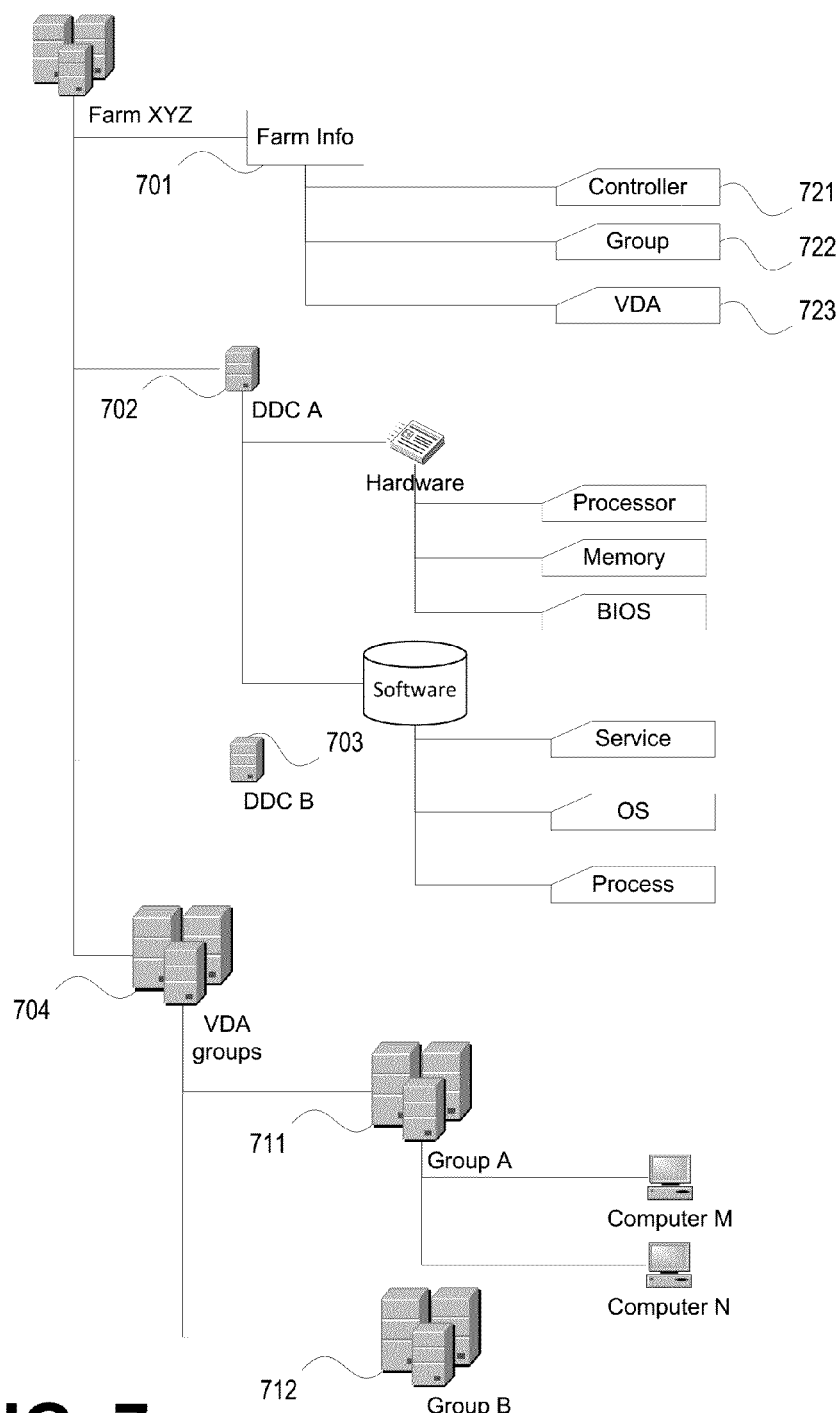

FIG. 7 illustrates another example of a hierarchy that may be used to organize information collected from multiple computing systems. FIG. 7 is similar to the hierarchies shown in FIGS. 5 and 6, but it illustrates more possibilities for how information may be grouped. Nodes 702 and 703 of FIG. 7 correspond to two desktop delivery controllers. Node 704 corresponds to virtual desktop access servers. These virtual desktop access servers have been separated into two groups ("Group A," at node 711 and "Group B," at node 712). The difference between "Group A" and "Group B" may be purely logical. Alternatively, any number of real differences may separate "Group A" from "Group B," such as differences in server location, capabilities, configuration, etc.

Node 701 corresponds to information for the entire server farm shown in FIG. 7. This information is not necessarily specific to any one computing system in the farm. Rather, it relates to the configuration or utilization of the entire server farm. For example, node 721 may represent the collective utilization and/or configuration of all of the controllers in the server farm. Similarly, node 723 may represent the collective utilization and/or configuration of the virtual desktop access servers in the server farm. Node 722 may represent policies or other information common to the group. This information, like the other information collected, may be flagged based on the result of a comparison to reference data or to other collected data, such as data from other server farms.

Figure 8:
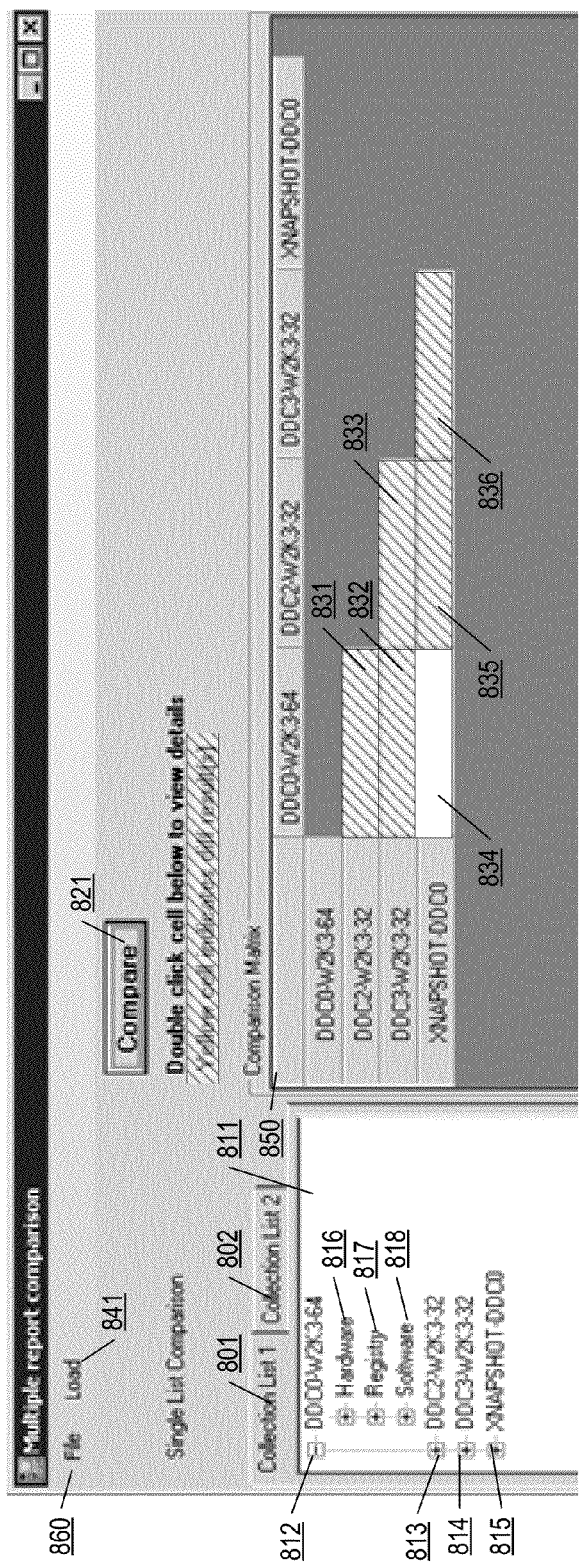
FIG. 8 illustrates an example of a user interface containing a menu area, a tree view area, and a data grid area.

FIG. 8 illustrates an example of a user interface containing a menu area 860, a tree view area 811, and a data grid area 850. Tree view area 811 includes four top-level nodes 812-815 and three sub-nodes 816-818. If each of nodes 813-818 were expanded, additional sub-nodes may be displayed. The data in tree view 811 is user-configurable. As seen by tabs 801 and 802, various different collections of data may be loaded into the tree view area 811. Additional collections of data may be loaded using the "load" drop down menu 841.

In the example of FIG. 8, the tree view may or may not include a visual indication of flagged data. A data grid containing such indications may be generated by clicking "Compare" button 821.

The data grid 850 of FIG. 8 includes a two dimensional grid that includes flags for when differences between the systems of the data grid are found. The flags may be shown by color and/or by a cross-hatched or other visual indication. In FIG. 8, cells 831, 832, 833, 835, and 836 are flagged, but cell 834 is not flagged. This indicates that the data collected for the two systems compared by each of cells 831, 832, 833, 835, and 836 differs, but the data collected for the two systems compared by cell 834 does not differ.

Although only one type of flag is shown in FIG. 8, several different types of flags may be used. For example, cells of a data grid may be colored green where no flags have been raised, yellow where flags have been raised for configuration issues, and red where flags have been raised for system health issues. Similarly, information in addition to the flags may be displayed in a data grid.

Data grid 850 is shown at the level of entire computing systems, but the comparison may be performed at other levels. For example, entire groups of computing systems may be compared. Another example is that only collected information related to software may be compared across the systems.

Clicking on, or otherwise selecting, individual cells of a data grid 850 may load a data grid at the next lower level of granularity. For example, selecting a cell of the data grid 850 may load a new data grid indicating whether differences were found between the two systems being compared with respect to hardware and software. The information hierarchies of FIGS. 5-7 illustrate examples of the levels of granularity at which data grids may be generated. In some embodiments where the information hierarchy is viewable, such as embodiments including tree view area 402, clicking on various levels of the hierarchy, or otherwise selecting the various levels, may load data grids at a corresponding level of granularity. The tree view of the information hierarchy may also be used to select individual computing systems or components thereof to be displayed in the data grid area.

A one-dimensional grid may be used in place of the two-dimensional grid shown in FIG. 8 where the collected data for each system is compared to reference data instead of to the data for other systems.

Figure 9:
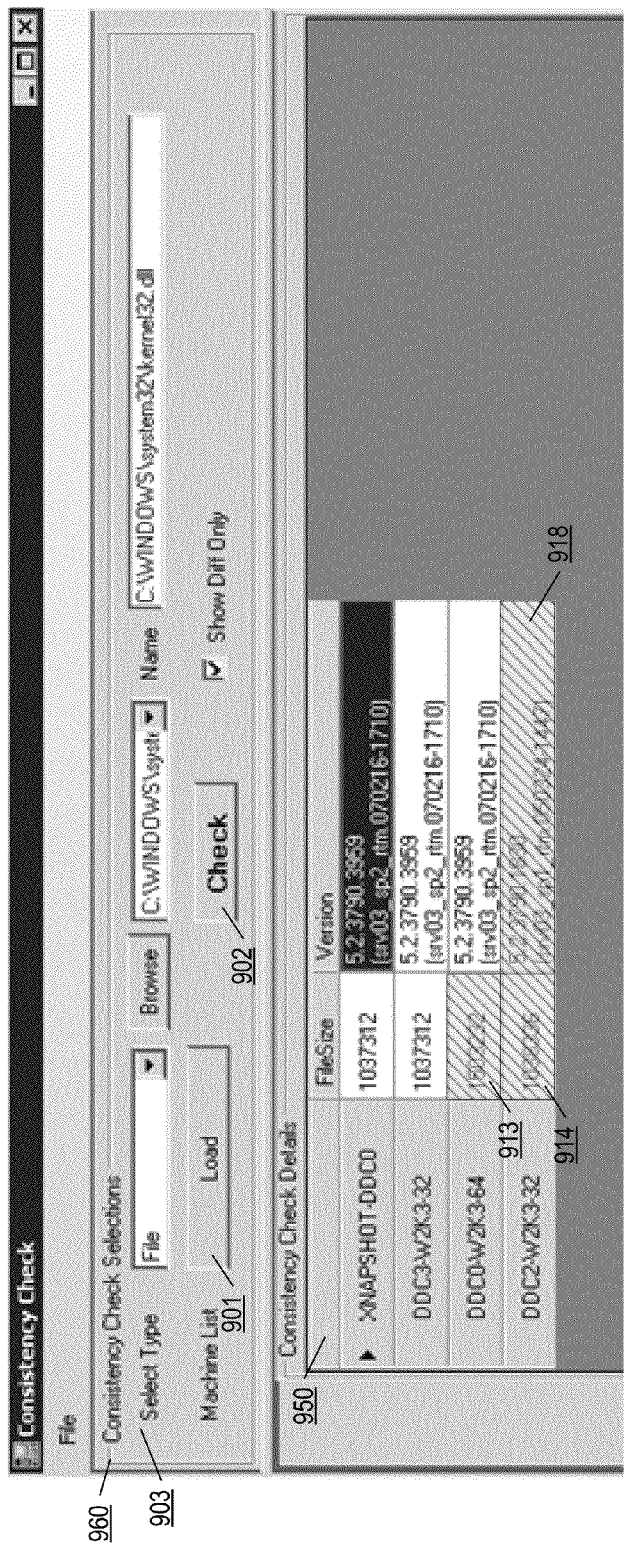

FIG. 9 shows another example of a two dimensional data grid (950). In this example, collected information about a single file is compared across four computing systems. As seen in the data grid 950, cells 913, 914, and 918 are flagged. In some embodiments or configurations, the flagging indicates a difference from the reference data. In other embodiments or configurations, the flagging indicates a difference from the other systems involved in the comparison.

The menu area 960 of FIG. 9 illustrates another interface for generating the flags for collected information. Instead of comparing a pre-defined set of information that includes multiple items, the menu area of FIG. 9 allows for information about a single item to be compared across systems. Load button 901 may be used to select a list of computing systems to collect information from. The single item of information to be checked is specified by the drop-down boxes and text boxes seen in row 903. Button 902 performs the specified comparison and causes the results to be displayed.

Figure 10:
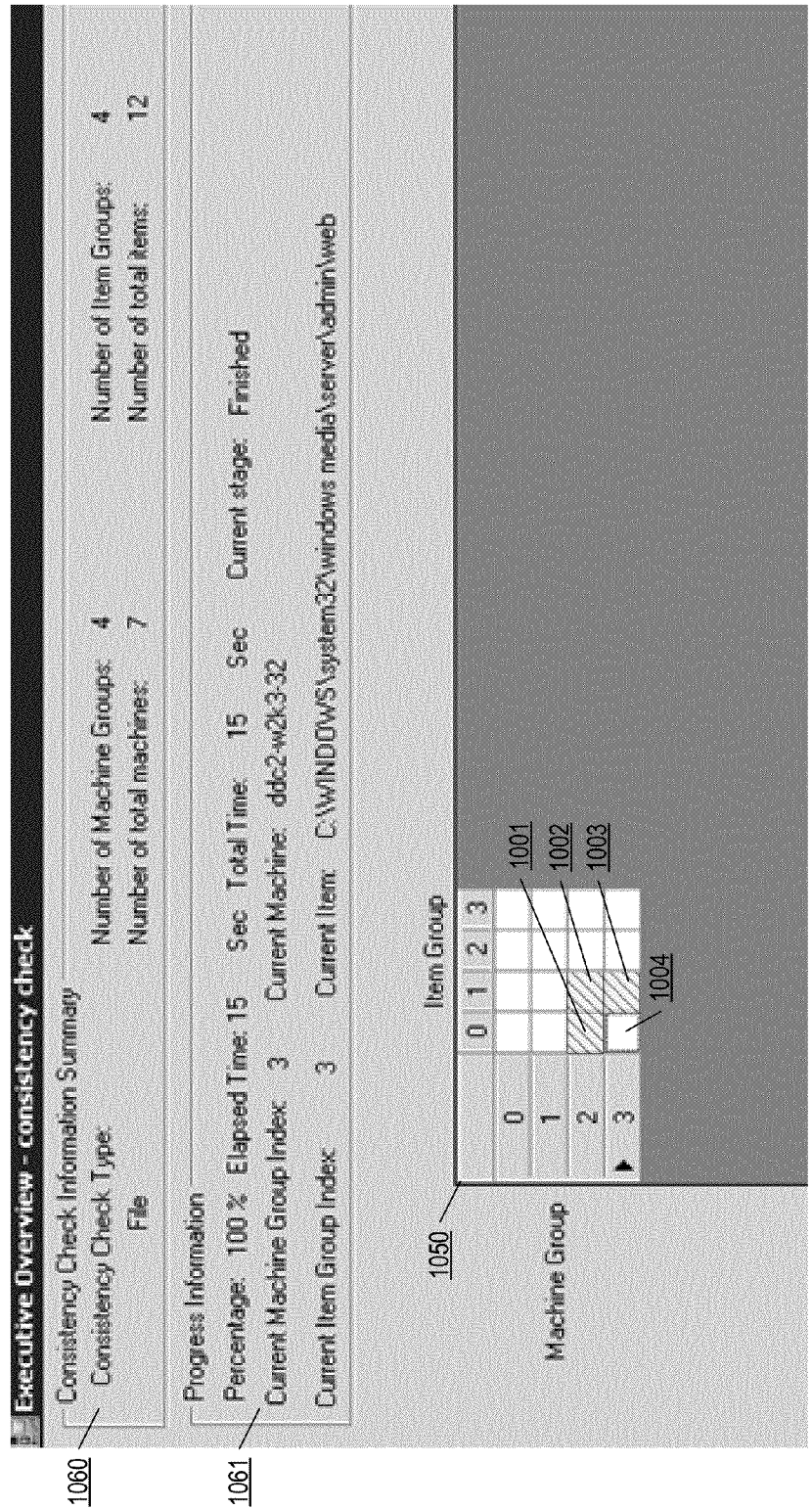

FIG. 10 illustrates a further example of a two-dimensional data grid 1050. In data grid 1050, the results of comparing reference data to information collected from four groups of machines is displayed. Each group of machines is represented by a row of grid 1050. The collected information is divided into four groups, each of which is represented by a column of grid 1050. Only cells 1001, 1002, and 1003 are flagged, which indicates that the collected information that corresponds to each of the other cells matched or was compatible with the reference data.

Note that in FIG. 10 an example of a utility output area is shown by boxes 1060 and 1061. It is to be understood that a variety of other formats for a utility output area are possible.

Figure 11:
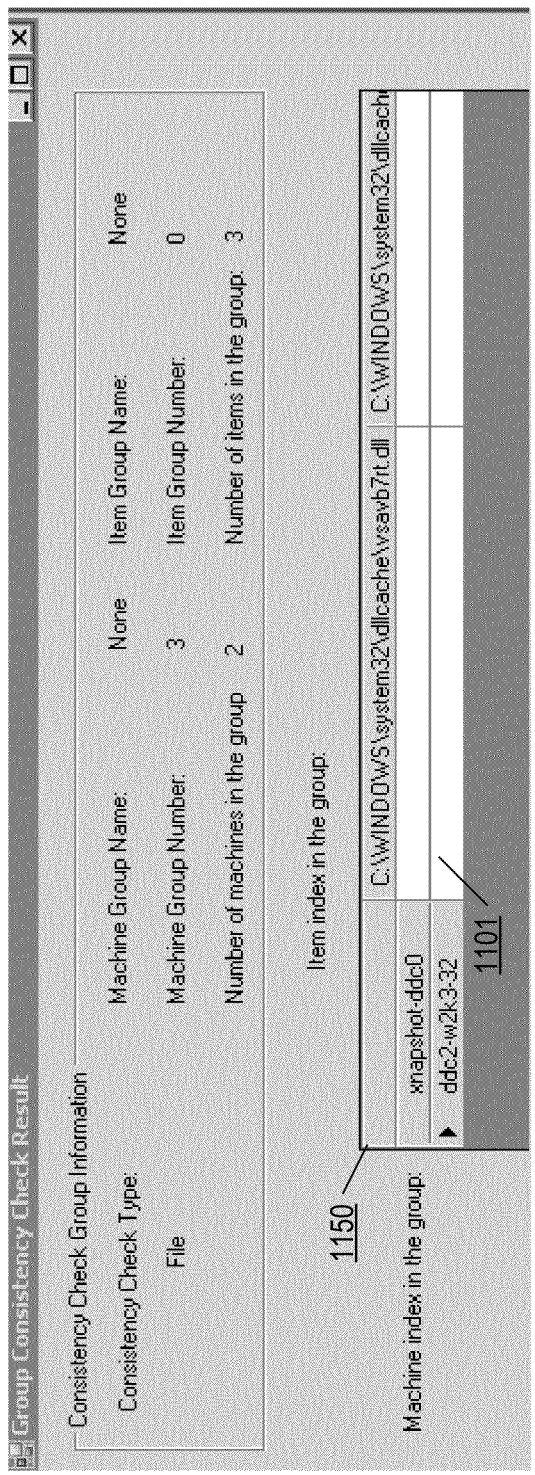

Clicking on, or otherwise selecting, an individual cell of data grid 1050 loads a new data grid at a lower level of granularity. FIG. 11 shows data grid 1150, which is an example of a data grid that may be displayed after selecting cell 1004 of data grid 1050. The rows of the data grid 1150 show the individual computing devices that make up the group of machines represented by cell 1004. The columns of the data grid 1150 show the individual items that make up the group of collected information represented by cell 1004. Cell 1004 was not flagged. Thus, none of the items in data grid 1150 are flagged. If cell 1004 had been flagged, then at least one of the items in data grid 1150 would have been flagged.

Figure 12:
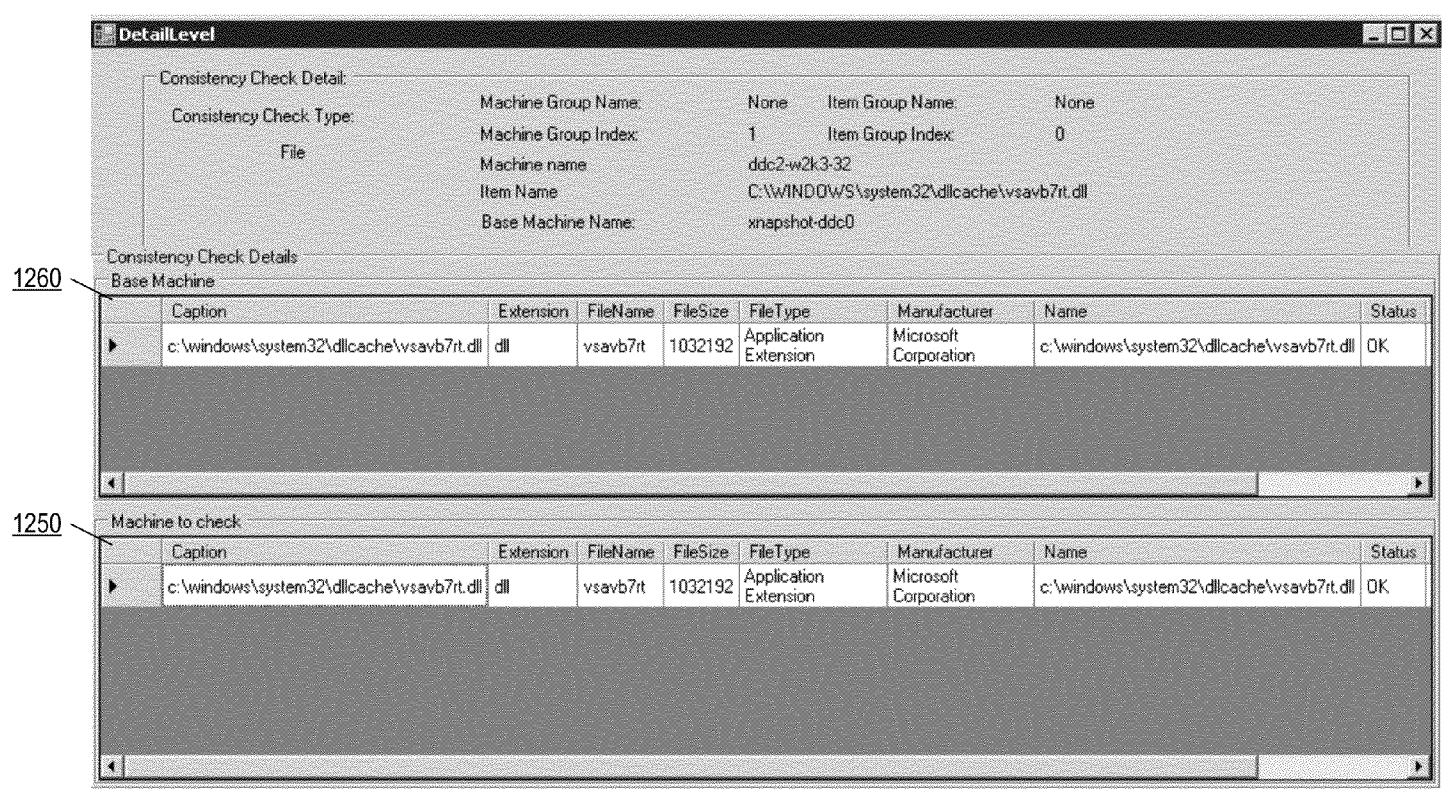

FIG. 12 shows two one-dimensional data grids 1250 and 1260. These data grids are an example of what may be displayed in response to selecting cell 1101 of data grid 1150. Data grid 1250 is of a lower level of granularity than data grid 1150 in that it displays further details about the file represented by the column containing cell 1101. Data grid 1260 represents the reference data against which the information in data grid 1250 is checked.

Figure 13:
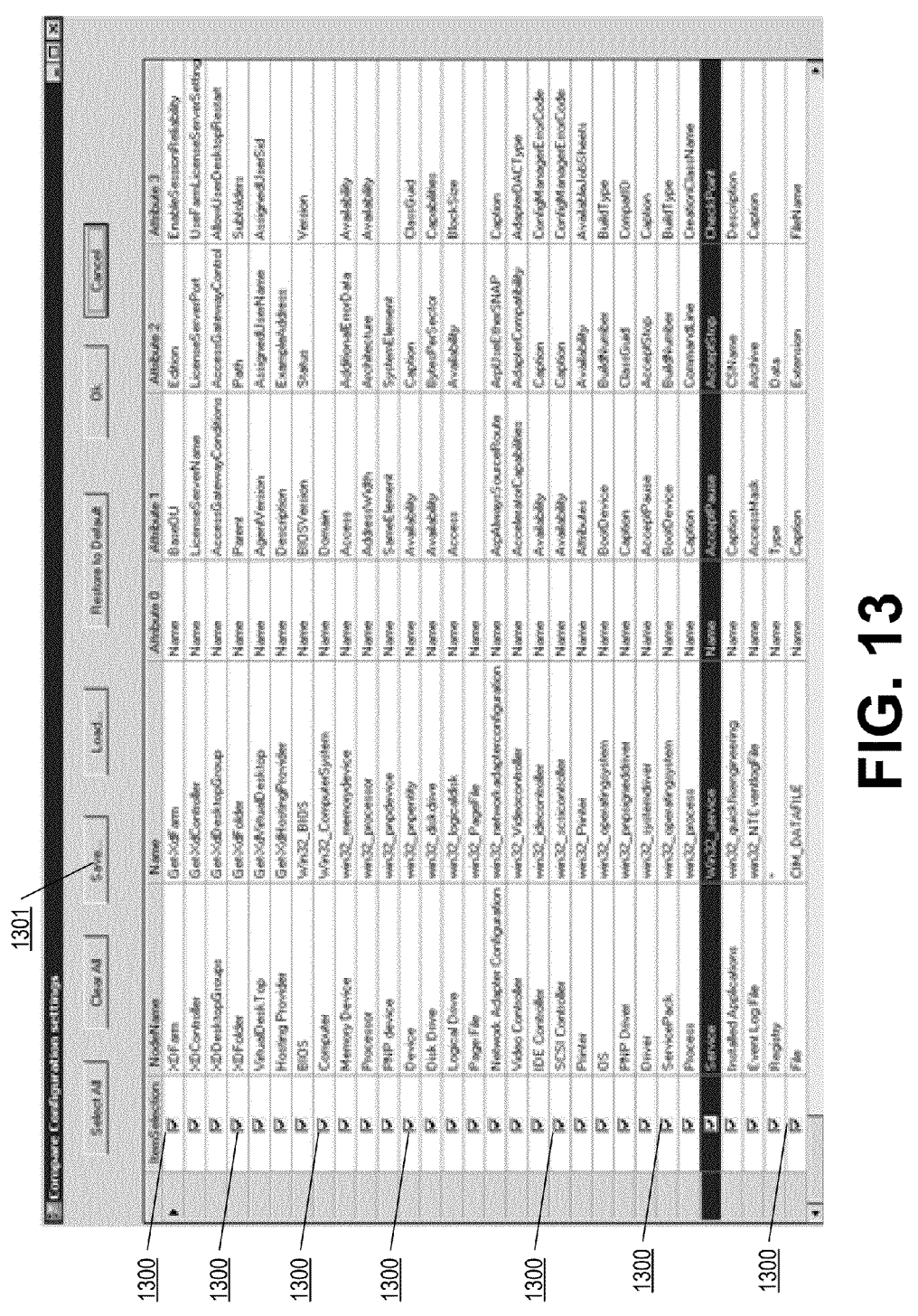
Figure 14:
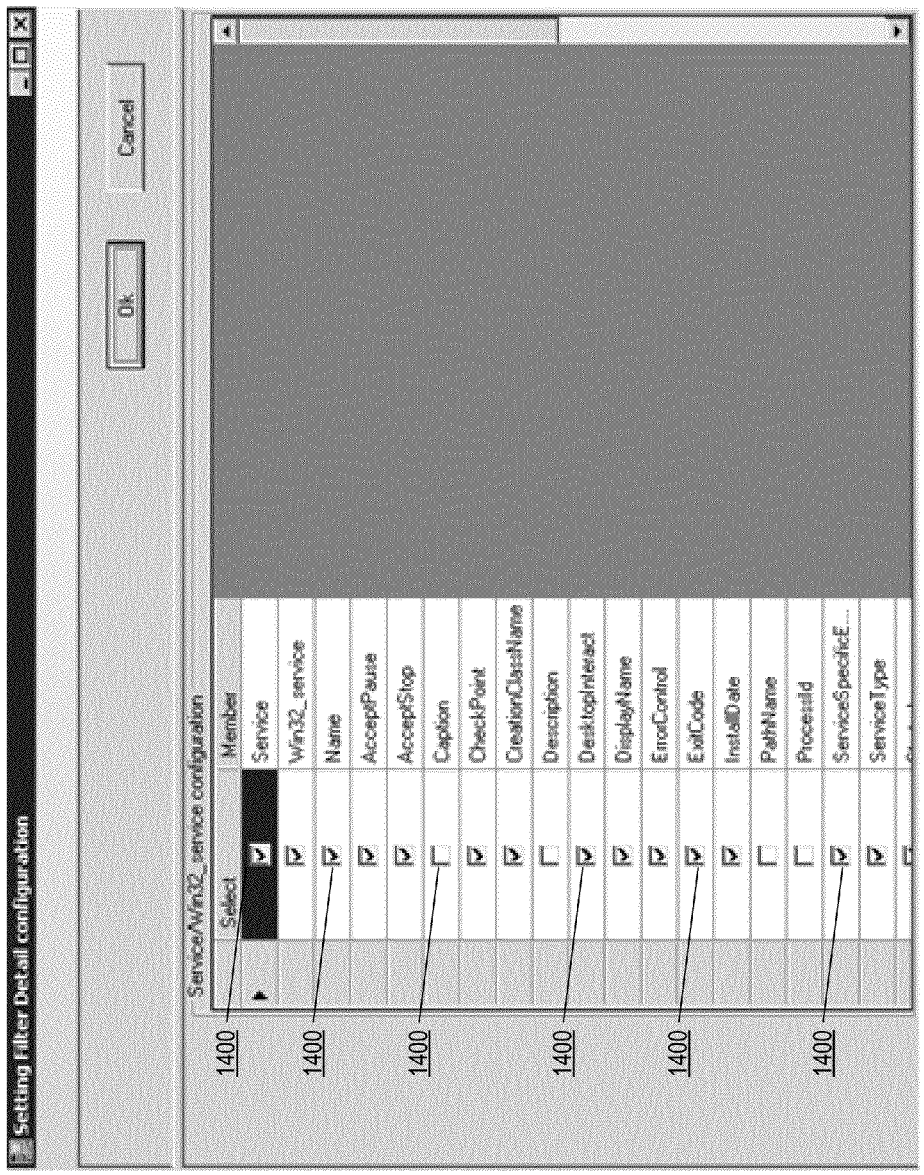

FIGS. 13 and 14 illustrate examples of a user interface that may be used to specify the individual items that are to be collected from computing systems for comparison. In FIGS. 13 and 14, check boxes 1300 and 1400 are checked to include an item in the collected data and unchecked to exclude an item from the collected data. As seen by button 1301 of FIG. 13, this interface may be used to save the set of data to be collected. The set of data may be saved as, for example, an XML file. In some embodiments, the information to be collected may be specified separately from the information to be compared and potentially flagged.

The computing systems from which to collect data may be discovered automatically. Alternatively, the computing systems may be specified using a similar interface to those shown in FIGS. 13 and 14. The computing systems to collect data from may also be specified with an XML file. The XML file specifying the computing systems to collect data from may group the computing systems and may specify which set of information to be collected corresponds with each system or group of systems.

The process of collecting information may be automated. In some embodiments, the collected information may be continually or periodically updated. Further, in some embodiments a user interface displaying flagged items is launched automatically when a misconfigured system is identified. In some embodiments alerts may be raised when a flagged item is identified. This may be particularly useful when a misconfiguration is evidenced by health information, such as low memory or error conditions. Examples of alerts include messages, such as e-mails or text messages, and user interface alerts, such as pop-ups or desktop notifications. Diagnostic information, such as memory dumps, may be collected and saved whenever misconfiguration is detected.

In still other embodiments, some or all of the information is collected in response to a user request instead of being collected automatically. The information may be collected together in a batch, or it may be collected piecemeal in response to a user's actions. For example, details of a computing system's registry information may not be collected until a user selects that system's registry information in the tree view area 402.

The user interfaces described above may be integrated with system administration and repair tools. For example, commands to revert a computing system to its last known good configuration may be incorporated in the user interface. Other examples include automatically copying files or other data from a reference system to a misconfigured computing system and providing shortcuts to virtual desktop access, a command line interface, or other administration tools associated with the monitored computing systems. The tools may be made accessible, for example, by including links to the tools on a right-click menu or in menu area 401.

In some embodiments, the data grid or tree view user interfaces may be used to collect additional information. For example, a user may be able to select the "Registry" item in the hierarchy and then request that more information about the registry for an individual computing system or group of the computing systems be collected. Thus, the above-described user interfaces may be used to gather additional information beyond any initially collected or automatically collected information.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. One or more non-transitory computer-readable media having instructions stored thereon that when executed by one or more computers cause the one or more computers to:
    identify one or more items of configuration information collected from a plurality of virtualized computing systems running on a same physical machine, each virtualized computing system of the plurality of virtualized computing systems comprising an operating system instance distinct from operating system instances of other virtualized computing systems of the plurality of virtualized computing systems;
    display a user interface comprising a data tree that summarizes, at a first level of granularity, the one or more items of configuration information collected from the plurality of virtualized computing systems and comprises one or more differentiating node icons that visually identify one or more groups of virtualized computing systems, of the plurality of virtualized computing systems, identified based on their domain membership and association with a portion of the one or more items of configuration information collected from the plurality of virtualized computing systems that comprises configuration information differing from saved reference data for the one or more groups of virtualized computing systems; and
    responsive to a user selection of a differentiating node icon, of the one or more differentiating node icons, corresponding to a group of the one or more groups of virtualized computing systems, display, on the user interface, at a second level of granularity, and for the group of the one or more groups of virtualized computing systems, a portion of the configuration information differing from the saved reference data for the one or more groups of virtualized computing systems, wherein the second level of granularity is more detailed than the first level of granularity.

2. The one or more non-transitory computer-readable media of claim 1, wherein the instructions, when executed by the one or more computers, cause the one or more computers to display, on the user interface and at the second level of granularity, one or more visual indications of sub-groups of the group of the one or more groups of virtualized computing systems, wherein the one or more visual indications of sub-groups visually identify one or more sub-groups of the group of the one or more groups of virtualized computing systems, the one or more sub-groups being associated with one or more items of configuration information of the portion of the configuration information differing from the saved reference data for the one or more groups of virtualized computing systems.

3. The one or more non-transitory computer-readable media of claim 1, wherein the instructions, when executed by the one or more computers, cause the one or more computers to display, on the user interface and at the second level of granularity, a summary of the portion of the configuration information differing from the saved reference data for the one or more groups of virtualized computing systems.

4. The one or more non-transitory computer-readable media of claim 1, wherein the instructions, when executed by the one or more computers, cause the one or more computers to determine, based on a comparison of the one or more items of configuration information collected from the plurality of virtualized computing systems with the saved reference data for the one or more groups of virtualized computing systems, that the portion of the one or more items of configuration information collected from the plurality of virtualized computing systems that comprises the configuration information differing from the saved reference data for the one or more groups of virtualized computing systems comprises one or more items of configuration information that differ from one or more corresponding items of configuration information in the saved reference data for the one or more groups of virtualized computing systems.

5. The one or more non-transitory computer-readable media of claim 4, wherein the user interface comprises a one-dimensional data grid illustrating results of the comparison.

6. The one or more non-transitory computer-readable media of claim 5, wherein the one-dimensional data grid comprises one or more color-coded cells corresponding to the one or more items of configuration information that differ from the one or more corresponding items of configuration information in the saved reference data.

7. The one or more non-transitory computer-readable media of claim 1, wherein the instructions, when executed by the one or more computers, cause the one or more computers to determine, based on a comparison of a first portion of the one or more items of configuration information collected from the plurality of virtualized computing systems with a second portion of the one or more items of configuration information collected from the plurality of virtualized computing systems, that one or more items of configuration information in the first portion differ from one or more corresponding items of configuration information in the second portion, the first portion comprising configuration information for a virtualized computing system of the plurality of virtualized computing systems, and the second portion comprising configuration information for one or more other virtualized computing systems of the plurality of virtualized computing systems.

8. The one or more non-transitory computer-readable media of claim 7, wherein the user interface comprises a two-dimensional data grid illustrating results of the comparison.

9. The one or more non-transitory computer-readable media of claim 8, wherein the two-dimensional data grid comprises one or more color-coded cells corresponding to differences between the first portion of the one or more items of configuration information and the second portion of the one or more items of configuration information.

10. A method comprising:
identifying one or more items of configuration information collected from a plurality of virtualized computing systems running on a same physical machine, each virtualized computing system of the plurality of virtualized computing systems comprising an operating system instance distinct from operating system instances of other virtualized computing systems of the plurality of virtualized computing systems;
displaying, by a computing device, a user interface comprising a data tree that summarizes, at a first level of granularity, the one or more items of configuration information collected from the plurality of virtualized computing systems and comprises one or more differentiating node icons that visually identify one or more groups of virtualized computing systems, of the plurality of virtualized computing systems, identified based on their domain membership and association with a portion of the one or more items of configuration information collected from the plurality of virtualized computing systems that comprises configuration information differing from saved reference data for the one or more groups of virtualized computing systems; and
responsive to a user selection of a differentiating node icon, of the one or more differentiating node icons, corresponding to a group of the one or more groups of virtualized computing systems, displaying, on the user interface, at a second level of granularity, and for the group of the one or more groups of virtualized computing systems, a portion of the configuration information differing from the saved reference data for the one or more groups of virtualized computing systems, wherein the second level of granularity is more detailed than the first level of granularity.

11. The method of claim 10, comprising displaying, on the user interface and at the second level of granularity, one or more visual indications of sub-groups of the group of the one or more groups of virtualized computing systems, wherein the one or more visual indications of sub-groups visually identify one or more sub-groups of the group of the one or more groups of virtualized computing systems, the one or more sub-groups being associated with one or more items of configuration information of the portion of the configuration information differing from the saved reference data for the one or more groups of virtualized computing systems.

12. The method of claim 10, comprising displaying, on the user interface and at the second level of granularity, a summary of the portion of the configuration information differing from the saved reference data for the one or more groups of virtualized computing systems.

13. The method of claim 10, comprising determining, based on a comparison of the one or more items of configuration information collected from the plurality of virtualized computing systems with the saved reference data for the one or more groups of virtualized computing systems, that the portion of the one or more items of configuration information collected from the plurality of virtualized computing systems that comprises the configuration information differing from the saved reference data for the one or more groups of virtualized computing systems comprises one or more items of configuration information that differ from one or more corresponding items of configuration information in the saved reference data for the one or more groups of virtualized computing systems.

14. The method of claim 13, wherein the user interface comprises a one-dimensional data grid illustrating results of the comparison.

15. The method of claim 14, wherein the one-dimensional data grid comprises one or more color-coded cells corresponding to the one or more items of configuration information that differ from the one or more corresponding items of configuration information in the saved reference data.

16. The method of claim 10, comprising determining, based on a comparison of a first portion of the one or more items of configuration information collected from the plurality of virtualized computing systems with a second portion of the one or more items of configuration information collected from the plurality of virtualized computing systems, that one or more items of configuration information in the first portion differ from one or more corresponding items of configuration information in the second portion, the first portion comprising configuration information for a virtualized computing system of the plurality of virtualized computing systems, and the second portion comprising configuration information for one or more other virtualized computing systems of the plurality of virtualized computing systems.

17. The method of claim 16, wherein the user interface comprises a two-dimensional data grid illustrating results of the comparison.

18. The method of claim 17, wherein the two-dimensional data grid comprises one or more color-coded cells corresponding to differences between the first portion of the one or more items of configuration information and the second portion of the one or more items of configuration information.

19. A system comprising:
at least one processor; and
a memory comprising instructions that when executed by the at least one processor cause the system to:
identify one or more items of configuration information collected from a plurality of virtualized computing systems running on a same physical machine, each virtualized computing system of the plurality of virtualized computing systems comprising an operating system instance distinct from operating system instances of other virtualized computing systems of the plurality of virtualized computing systems;
display a user interface comprising a data tree that summarizes, at a first level of granularity, the one or more items of configuration information collected from the plurality of virtualized computing systems and comprises one or more differentiating node icons that visually identify one or more groups of virtualized computing systems, of the plurality of virtualized computing systems, identified based on their domain membership and association with a portion of the one or more items of configuration information collected from the plurality of virtualized computing systems that comprises configuration information differing from saved reference data for the one or more groups of virtualized computing systems; and
responsive to a user selection of a differentiating node icon, of the one or more differentiating node icons, corresponding to a group of the one or more groups of virtualized computing systems, display, on the user interface, at a second level of granularity, and for the group of the one or more groups of virtualized computing systems, a portion of the configuration information differing from the saved reference data for the one or more groups of virtualized computing systems, wherein the second level of granularity is more detailed than the first level of granularity.

20. The system of claim 19, wherein the instructions, when executed by the at least one processor, cause the system to display, on the user interface and at the second level of granularity, one or more visual indications of sub-groups of the group of the one or more groups of virtualized computing systems, wherein the one or more visual indications of sub-groups visually identify one or more sub-groups of the group of the one or more groups of virtualized computing systems, the one or more sub-groups being associated with one or more items of configuration information of the portion of the configuration information differing from the saved reference data for the one or more groups of virtualized computing systems.

21. The system of claim 19, wherein the instructions, when executed by the at least one processor, cause the system to display, on the user interface and at the second level of granularity, a summary of the portion of the configuration information differing from the saved reference data for the one or more groups of virtualized computing systems.

22. The system of claim 19, wherein the instructions, when executed by the at least one processor, cause the system to determine, based on a comparison of the one or more items of configuration information collected from the plurality of virtualized computing systems with the saved reference data for the one or more groups of virtualized computing systems, that the portion of the one or more items of configuration information collected from the plurality of virtualized computing systems that comprises the configuration information differing from the saved reference data for the one or more groups of virtualized computing systems comprises one or more items of configuration information that differ from one or more corresponding items of configuration information in the saved reference data for the one or more groups of virtualized computing systems.

23. The system of claim 22, wherein the user interface comprises a one-dimensional data grid illustrating results of the comparison.

24. The system of claim 23, wherein the one-dimensional data grid comprises one or more color-coded cells corresponding to the one or more items of configuration information that differ from the one or more corresponding items of configuration information in the saved reference data.

25. The system of claim 19, wherein the instructions, when executed by the at least one processor, cause the system to determine, based on a comparison of a first portion of the one or more items of configuration information collected from the plurality of virtualized computing systems with a second portion of the one or more items of configuration information collected from the plurality of virtualized computing systems, that one or more items of configuration information in the first portion differ from one or more corresponding items of configuration information in the second portion, the first portion comprising configuration information for a virtualized computing system of the plurality of virtualized computing systems, and the second portion comprising configuration information for one or more other virtualized computing systems of the plurality of virtualized computing systems.

26. The system of claim 25, wherein the user interface comprises a two-dimensional data grid illustrating results of the comparison.

27. The system of claim 26, wherein the two-dimensional data grid comprises one or more color-coded cells corresponding to differences between the first portion of the one or more items of configuration information and the second portion of the one or more items of configuration information.

* * * * *